May 4, 1965  A. F. McFARLAND ETAL  3,182,191
WATER PURIFYING APPARATUS WITH AN AUTOMATICALLY
ACTUATED WIPER FOR THE ULTRA-VIOLET SOURCE
Filed Feb. 14, 1963  2 Sheets-Sheet 1
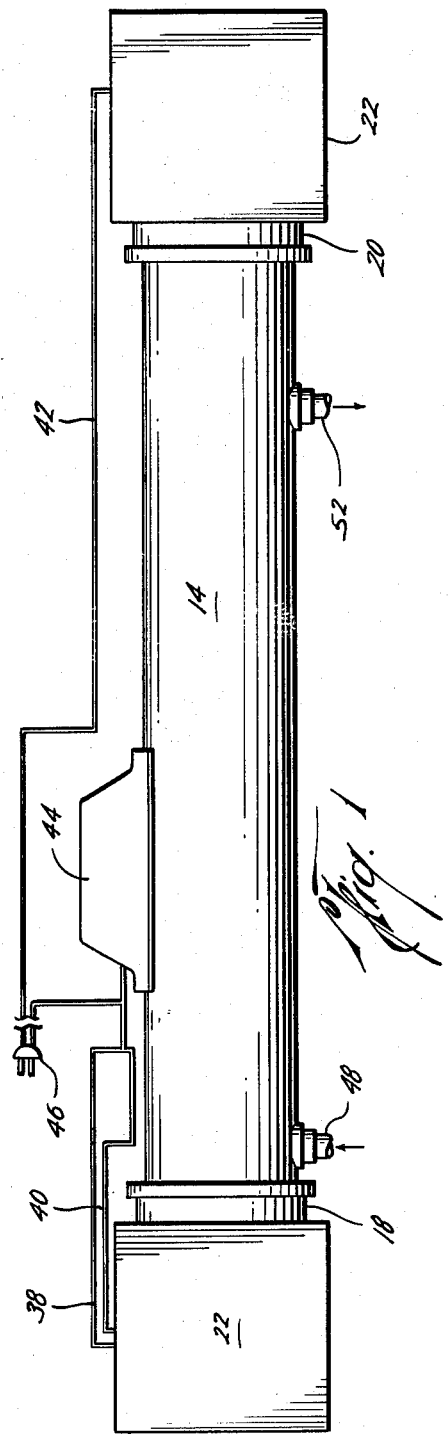
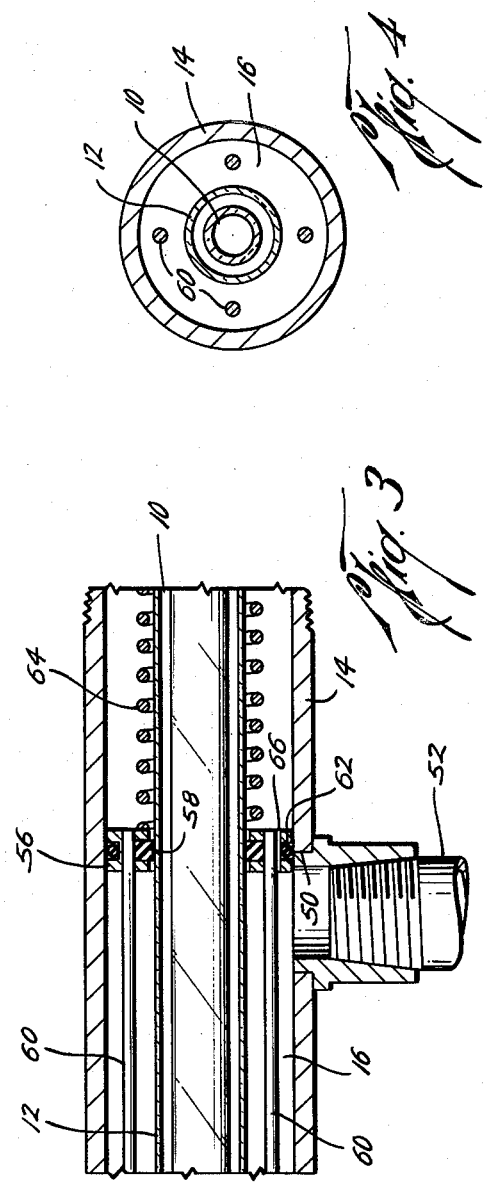
Artie F. McFarland
Arthur E. McFarland
INVENTORS
BY Charles E. Lightfoot
ATTORNEY

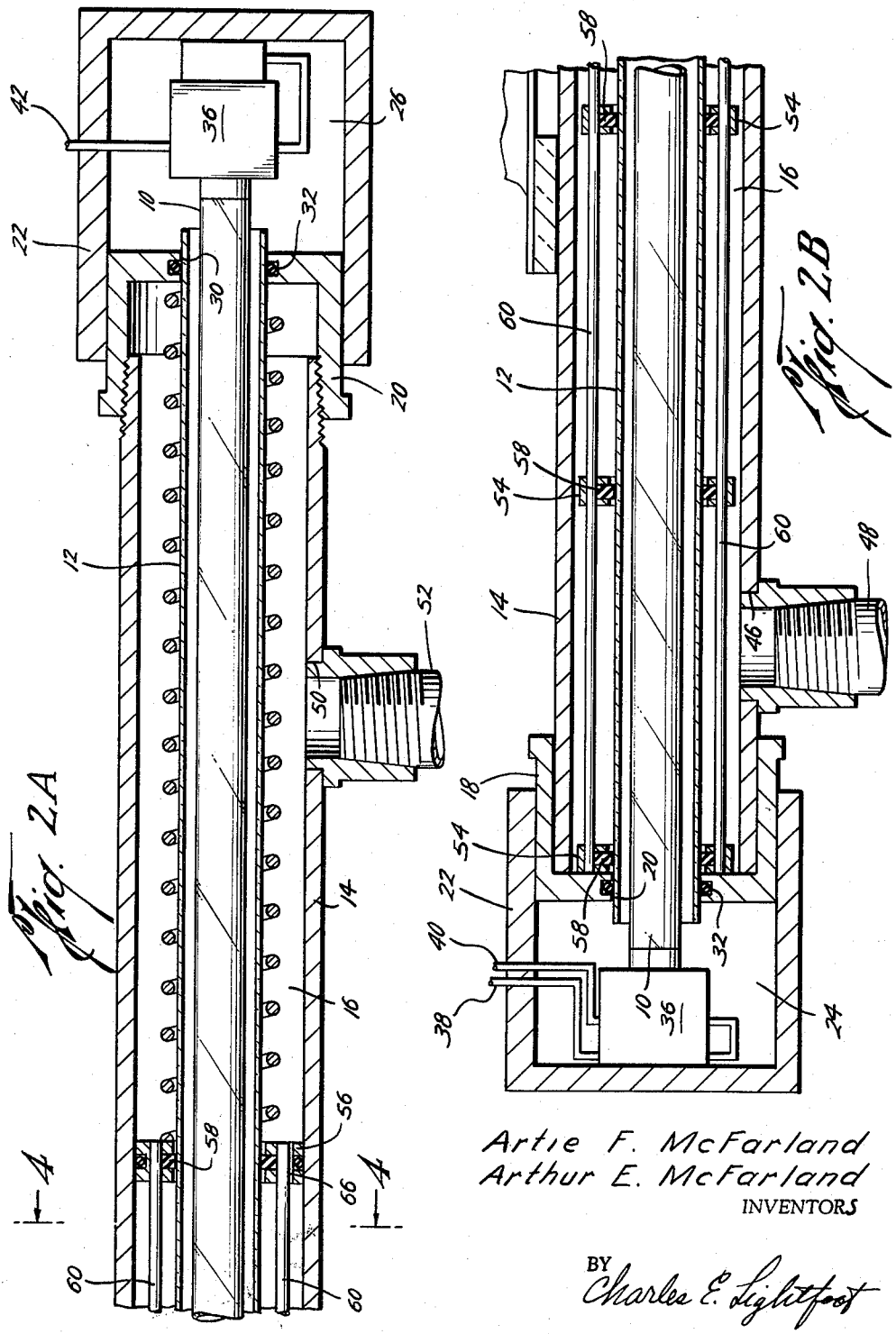

United States Patent Office 3,182,191
Patented May 4, 1965

3,182,191
WATER PURIFYING APPARATUS WITH AN AUTOMATICALLY ACTUATED WIPER FOR THE ULTRA-VIOLET SOURCE
Artie F. McFarland and Arthur E. McFarland, Houston, Tex., assignors to Puretest Water Purifier Co., Houston, Tex., a corporation of Texas
Filed Feb. 14, 1963, Ser. No. 258,538
6 Claims. (Cl. 250—43)

This invention relates to the purification of water and more particularly to apparatus for the treatment of water by subjecting the same to radiant energy, such as ultraviolet light, for the purpose of destroying germs, bacteria and the like in drinking water.

The invention is capable of use for a number of different purposes and under various conditions, and finds particular application in connection with domestic water supply systems, such as those in which it is important that water for drinking purposes be dispensed in a highly purified state.

The invention has for an important object the provision of water purification apparatus which is adapted to be connected into a water supply line and by which purification of the water takes place as the same is dispensed.

Another object of the invention is to provide water purification apparatus embodying means for causing water to flow in a thin layer through an illuminated zone whereby the water is substantially uniformly exposed to radiant energy to purify the same.

A further object of the invention is the provision in water purification apparatus of the type mentioned of an elongated, tubular light source enclosed in a surrounding, protective cylinder formed of material which is transparent to the purifying rays from the illuminant and having an outer tubular casing surrounding the cylinder to form an annular passageway through which water to be exposed to such illumination may flow.

Another object of the invention is the provision in apparatus of the kind preferred to of wiper means movably disposed in the outer casing in wiping engagement with the external surface of the protective cylinder and means for causing the wiper means to move longitudinally of the apparatus in response to the flow of water therethrough and the cessation of such flow to wipe the cylinder clean whereby the formation of a coating on the cylinder which would interfere with the transmission of light therethrough is prevented.

A still further object of the invention is to provide water purifying apparatus of the kind mentioned which is of simple design and economical manufacture, in which the various parts are easily replaceable, and in which means is embodied for keeping the apparatus in a clean and efficiently operating condition.

The above and other important objects and advantages of the invention may best be understood from the following detailed description of a preferred embodiment of the same, reference being had to the accompanying drawings, wherein—

FIGURE 1 is a side elevational view of the apparatus;
FIGURE 2A is a fragmentary, central, longitudinal, cross-sectional view, on an enlarged scale, of the invention as illustrated in FIGURE 1, showing the right hand end portion thereof with the parts in the relative positions which they occupy when the flow of water through the apparatus is turned off;
FIGURE 2B is a view similar to that of FIGURE 2A showing the left hand end portion of the invention as illustrated in FIGURE 1, FIGURE 2B being a continuation of FIGURE 2A;
FIGURE 3 is a fragmentary, central, longitudinal, cross-sectional view of a portion of the apparatus similar to that of FIGURE 2A showing the relative positions of the parts of the apparatus during the flow of water therethrough; and
FIGURE 4 is a cross-sectional view, taken along the line 4—4 of FIGURE 2A, looking in the direction indicated by the arrows.

Referring now to the drawings in greater detail, the invention is illustrated herein in connection with its use in the purification of water primarily intended for drinking for the purpose of reducing the bacterial content of the water. The apparatus of the invention may be employed under some circumstances as the sole means of purification of drinking water from sources suspected of being contaminated or as an additional precautionary means in connection with water systems in which conventional purification measures have also been employed.

In the present illustration the apparatus employs as a source of radiant energy for purification a conventional gas-filled electric lamp 10 of elongated cylindrical shape, of the type which emits ultraviolet light, which source is enclosed in an inner protective cylinder 12, formed of suitable material, such as quartz, capable of transmitting ultraviolet rays, the lamp and cylinder being surrounded by an outer tubular casing 14 which forms with the cylinder an annular passageway 16 through which the water to be treated may flow. The passageway 16 is preferably of a radial thickness such that the annular layer of water which flows through the apparatus will be thoroughly penetreated by the radiant energy from the source 10 to be effectively destroy bacterial or other similar contamination in the water whereby the same are rendered harmless to animal life.

The tubular casing 14 may conveniently be formed with a main body portion, such as a cylindrical pipe of metal, plastic, or the like, having at one end a cap 18 cemented or otherwise attached thereto and at the other end an internally threaded cap 20 which is threadably attached and which may be removed to permit easy access to the interior of the casing.

At each end of the apparatus an outer end cover or cap 22 is fitted over the exterior of the caps 18 and 20 to form end chambers 24 and 26, respectively at the opposite ends of the casing.

The caps 18 and 20 are provided with central openings 28 and 30, through which the lamp 10 and cylinder 12 are extended into the chambers 24 and 26 and within which suitable seal forming means, such as the O-rings 32 are disposed, in internal grooves provided for the same, to form fluid tight seals between the external surface of the cylinder and the caps whereby leakage of water from the annular passageway 16 into the end chambers is prevented.

Within the end chambers 24 and 26 suitable fittings 36, of the usual type, are attached to the covers 22 to receive the ends of the lamp 10 and which are provided with internal contacts positioned for engagement with the usual end contacts on the lamp whereby electric current is supplied to the lamp through suitable conductors 38, 40 and 42 of an electrical circuit including a transformer or ballast 44, or other starter mechanism by which the lamp is operated. The electrical system is adapted for connection to a suitable source of electrical current, as by means of the usual plug 46 connected into the circuit and which may be inserted into any convenient electrical outlet.

The tubular casing 14 has an inlet opening 46, for connection to a source of water supply, such as a domestic water supply system of a dwelling, from which water for drinking purposes is ordinarily obtained, as by means of an inlet pipe 48, and spaced longitudinally from the inlet opening the casing is also provided with an outlet 50, for connection to a discharge pipe 52, leading to a spigot or other means by which the purified water is dispensed. By this arrangement when the spigot is opened water will flow from the sources through the annular passageway 16 wherein the water will be exposed to the ultraviolet rays or other radiant energy from the source 10 by which the water will be purified.

For the purpose of keeping the protective cylinder 12 in a clean condition, so that the radiant energy from the source will be readily transmitted therethrough to the water, a number of movable rings 54 and 56 are positioned in the annular passageway 16 in surrounding relation to the protective cylinder 12, each of which rings is of generally channel shape in radial cross-section, opening toward the cylinder and carrying wiper elements, 58, of ring shape, disposed in the channels of the ring members 56 and in supporting wiping contact with the external surface of the cylinder. The rings 54 and 56 are rigidly connected together in longitudinally spaced relation by rods 60, so that the rings may move simultaneously lontudinally in the annular passageway. The ring 56 which is disposed nearest to the outlet opening 50 is provided with an external seal, such as the O-ring 62, positioned for sealing engagement with the ring and with the internal wall of the casing, whereby fluid flow in the annular passageway 16 past the ring is substantially prevented.

The entire ring assembly is yieldingly urged toward the end of the casing in which the inlet 46 is located, as by means of a coil spring 64, surrounding the cylinder 12, and which bears at one end against the ring 56 and at the other end against the internal surface of the cap 20. By this means the wiper ring assembly is yieldingly held against movement in one direction in the casing.

The ring 56 is preferably provided with a small bleeder passageway, such as that shown at 66, through which water may flow through the annular passageway. Thus, when the water is turned on to allow an outflow through the discharge pipe 52 the pressure of water entering through the inlet pipe 48 will exert force against the the ring 56 to move the wiper ring assembly longitudinally against the pressure of the spring 64 until the ring 56 passes the outlet opening 50, whereupon the ring assembly will be held in such position as long as the water is flowing. When the discharge pipe 52 is closed the pressure on the ring 56 will become equalized by the leakage of water through the bleeder pipe 66 to allow the spring 64 to move the wiper assembly back to its initial position, thus rewiping the exterior of the protective cylinder.

It will be noted that the rings 54 are of somewhat smaller external diameter than the annular pasageway 12 so that water may flow freely through the passageway past these rings.

The rings 54 and 56 are suitably spaced apart, so that in the initial position of the wiper assembly, as illustrated in FIGURES 2A and 2B, with the flow of water turned off, the ring 56 will be located between the inlet opening 46 and the outlet opening 50, and when the water is turned on the pressure of water entering the inlet opening 46 will exert a force against the ring 56 to move the assembly against the pressure of the spring 64 until the ring 56 moves past the outlet opening 50, as illustrated in FIGURE 3, to allow the free flow of water through the annular passageway.

The wiper rings of the assembly are preferably spaced apart at shorter distances than the total travel of the wiper assembly, so that there will be some overlapping of the wiping movement of the rings, so that there will be no areas of the light transmitting portion of the protective cylinder which are not being wiped on each movement of the wiper assembly.

The wiper elements 58 may be formed of any suitable material, such as felt, rubber, or the like, by which a constant wiping contact is maintained against the external surface of the protective cylinder.

Thus, the apparatus of the invention provides means for purifying water by subjecting the same to radiant energy, such as ultraviolet light, and in which the light transmitting portions of the apparatus are automatically maintained in a clean condition at all times, thus substantially enhancing the efficiency of the apparatus.

The invention is disclosed herein in connection with a certain specific embodiment of the same but it will be understood by way of illustration only, and that numerous changes can be made in the construction and arrangement of the various parts, within the spirit of the invention and the scope of the appended claims.

Having thus clearly shown and described the invention, what is claimed as new and desired to secure by Letters Patent is:

1. In water purification apparatus an elongated, tubular electric lamp providing a source of ultra-violet illumination, a protective cylinder formed of a material transparent to ultra-violet light surrounding said lamp, an outer casing surrounding and forming with said cylinder an annular passageway through which water may flow in light receiving relation to said source, said casing having an inlet through which water may flow into said passageway and an outlet spaced longitudinally from said inlet, wiper means movably disposed in the passageway for movement longitudinally therein in surrounding contact with the cylinder and means in the passageway positioned for coaction with said wiper means to move the wiper means longitudinally in one direction in response to an increase in the pressure of water in said inlet and in the other direction in response to a decrease in such pressure.

2. In water purification apparatus an elongated, tubular electric lamp providing a source of ultra-violet illumination, a protective cylinder formed of a material transparent to ultra-violet light surrounding said lamp, an outer casing surounding and forming with said cylinder an annular passageway through which water may flow in light receiving relation to said source, said casing having an inlet through which water may flow into said passageway and an outlet spaced longitudinally from said inlet, means movably disposed in the passageway for longitudinal movement therein in surrounding relation to the cylinder and including wiper means surrounding and in wiping contact with the cylinder and seal forming means positioned in sliding contact with said casing, wiper and seal forming means being positioned to substantially close the passageway against the flow of water therethrough past said movable means to cause said movable means to move longitudinally in response to an increase in the pressure of water in said inlet, and yieldable means positioned for coaction with the movable means and casing to yieldingly urge the movable means in the other direction in response to a decrease in the pressure of water in said inlet.

3. In water purification apparatus an elongated, tubular electric lamp providing a source of ultra-violet illumination, a protective cylinder formed of a material transparent to ultra-violet light surrounding said lamp, an outer casing surrounding and forming with said cylinder an annular passageway through which water may flow in light receiving relation to said source, said casing having an inlet through which water may flow into said passageway and an outlet spaced longitudinally from said inlet, means movably disposed in the passageway for longitudinal movement therein in surrounding relation to the cylinder and including wiper means surrounding and in wiping contact with the cylinder and seal forming means surrounding the cylinder and in sealing contact with the casing, said wiper means and said seal forming means being positioned to substantially close the passageway when said seal forming means is between said inlet and said outlet, said movable means being movable with the water entering said inlet upon an outflow of water from the passageway through said outlet to position said seal forming means to open the passageway to the flow of water therethrough, and yieldable means positioned for coaction with the movable means and casing to yieldingly resist movement of said movable means toward the passageway opening position.

4. In water purification apparatus an elongated, tubular electric lamp providing a source of ultra-violet illumination, a protective cylinder formed of a material transparent to ultra-violet light surrounding said lamp, an outer casing surrounding and forming with said cylinder an annular passageway through which water may flow in light receiving relation to said source, said casing having an inlet through which water may flow into said passageway and an outlet spaced longitudinally from said inlet, means movably disposed in the passageway for longitudinal movement therein in surrounding relation to and in wiping contact with the cylinder and in sliding contact with the casing for movement to one position between said inlet and said outlet to substantially close the passageway and to another position to open the passageway to the flow of water therethrough, said movable means being movable from said one to said other position with the water entering said inlet upon the outflow of water from the passageway through said outlet and yieldable means positioned for coaction with said movable means and casing to yieldingly urge the movable means toward said one position.

5. In water purification apparatus an elongated, tubular electric lamp providing a source of ultra-violet illumination, a protective cylinder formed of a material transparent to ultra-violet light surrounding said lamp, an outer casing surrounding and forming with said cylinder an annular passageway through which water may flow in light receiving relation to said source, said casing having an inlet through which water may flow into said passageway and an outlet spaced longitudinally from said inlet, a plurality of longitudinally spaced wiper means movably disposed in the passageway in surrounding wiping contact with the cylinder, means movably disposed in the passageway for longitudinal movement therein in one direction in response to the inflow of water through said inlet upon an outflow of water through said outlet means forming a connection between said movable means and said wiper means to cause the wiper means to move with said movable means in one direction and yieldable means positioned for coaction with said movable means and said casing to yieldingly urge the wiper means in the other direction.

6. In water purification apparatus an elongated, tubular electric lamp providing a source of ultra-violet illumination, a protective cylinder formed of a material transparent to ultra-violet light surrounding said lamp, an outer casing surrounding and forming with said cylinder an annular passageway through which water may flow in light receiving relation to said source, said casing having an inlet through which water may flow into said passageway and an outlet spaced longitudinally from said inlet, a plurality of longitudinally spaced wiper means movably disposed in the passageway in surrounding wiping contact with the cylinder, means movably disposed in the passageway for longitudinal movement therein in one direction in response to the inflow of water through the inlet upon an outflow of water through said outlet from one position substantially closing the passageway between said inlet and said outlet to another position beyond said outlet to open the passageway to the flow of water therethrough, yieldable means positioned for coaction with said movable means and said casing to yieldingly urge said movable means in the other direction, said wiper means being spaced apart a lesser distance than the distance of movement of said movable means from said one to said other position and means connecting said movable means and said wiper means for movement together.

References Cited by the Examiner
UNITED STATES PATENTS

| | | | |
|---|---|---|---|
| 1,998,076 | 4/35 | Creighton et al. | 250—48 |
| 2,670,439 | 2/54 | Darney | 250—43 |
| 3,061,721 | 10/62 | Brenner | 250—43 |

RALPH G. NILSON, *Primary Examiner.*